May 13, 1924.

J. TYKOCINSKI-TYKOCINER

VARIABLE ELECTRIC UNIT

Filed Sept. 11, 1920

Inventor,
Joseph Tykocinski-Tykociner,

BY

Brown Boettcher & Dienner

ATTORNEY.

May 13, 1924.

J. TYKOCINSKI-TYKOCINER 1,493,713

VARIABLE ELECTRIC UNIT

Filed Sept. 11, 1920   2 Sheets-Sheet 2

Inventor;
Joseph Tykocinski-Tykociner

BY

Brown, Boettcher & Dienner
ATTORNEY.

Patented May 13, 1924.

1,493,713

UNITED STATES PATENT OFFICE.

JOSEPH TYKOCINSKI-TYKOCINER, OF URBANA, ILLINOIS.

VARIABLE ELECTRIC UNIT.

Application filed September 11, 1920. Serial No. 409,611.

*To all whom it may concern:*

Be it known that I, JOSEPH TYKOCINSKI-TYKOCINER, a citizen of the Republic of Poland, having declared my intention of becoming a citizen of the United States, and a resident of Urbana, in the county of Champaign and State of Illinois, have invented a certain new and useful Improvement in Variable Electric Units, of which the following is a full, clear, concise, and exact description, reference being made to the accompanying drawings, forming a part of this specification.

My invention relates to an improvement in variable electric units such as coils, windings and variable inductances for wireless telegraphy and telephony through air, water, soil or along conductors, and also for other applications of high frequency current.

One object of the invention is to provide simple and efficient variable windings and coils.

A further object of the invention is to provide light coils of large inductance or windings of large effective surface but collapsible for transportation.

A further object is to provide simple means for changing the self inductance, mutual inductance, and the coefficient of radiation of coils and windings, and the inductive couplings between a plurality of such coils or windings. In one embodiment of my invention I employ hollow flexible bodies filled with compressed gas or fluid, to form elastic structures capable of being changed in form or volume, and acting as carriers of the coils or windings.

Further objects and advantages of the invention will become apparent as the description proceeds.

Figure 8:
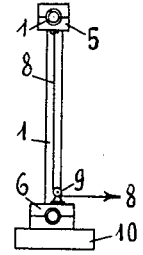
Figure 9:
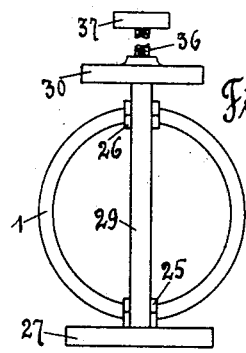
Figure 10:
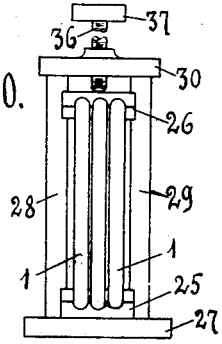
Figure 11:
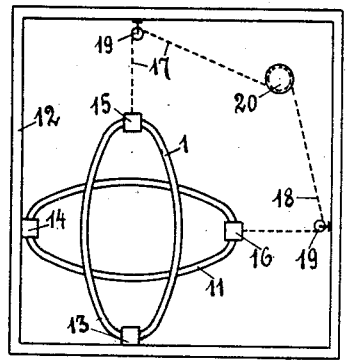
Figure 12:
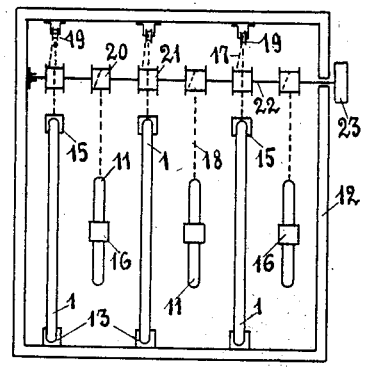
Figure 13:
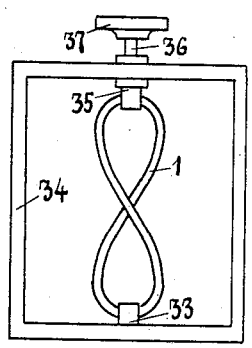
Figure 14:
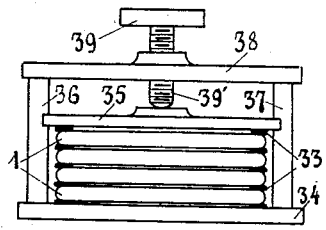
Figure 15:
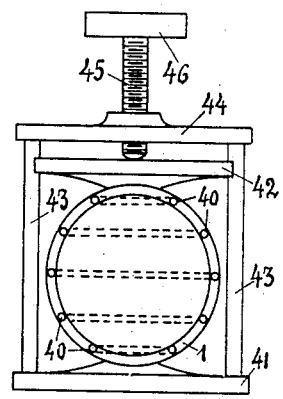

Fig. 8 a central section of a coil showing mechanical means for gradually changing the form of the coil;

Figs. 9 and 10 are front and side elevations illustrating another method for simultaneously adjusting a set of unit coils or a single helix;

Figs. 11 and 12 are side and front elevations showing two sets of coils, and means for varying the electric constants of each set, and the coupling between sets;

Fig. 13 shows an alternative method of varying the inductance of a unit coil by twisting it;

Figs. 14 and 15 illustrate alternative ways of changing the inductance of a set of windings or a helix by pressure normal to the plane of the windings.

The simplest way of carrying out the principle of the invention is to provide a metallic tube bent into a ring or helix, seal the tube at both ends, fill it with compressed air or other neutral compressed gas or fluid and mount it in any suitable manner on insulating supports. The advantage of introducing a compressed medium inside the tube is to reinforce it, permitting the use of thin tubes of large conducting surfaces, reduction of the weight of the metal, diminished skin effects, and increased strength.

The outstanding advantage of such a unit used as an antenna, an inductance winding, or part of a transformer or vario-coupler for transmission or receiving work, resides in the possibility of using windings of much greater diameter compared with the diameter of the tube than would be possible without the use of a compressed inflation medium. Additional windings of flexible insulated wire may be attached to the main ring or helix, and electrically connected to it either conductively or capacitatively, according to the purpose they have to serve in the complete set.

Figure 1:
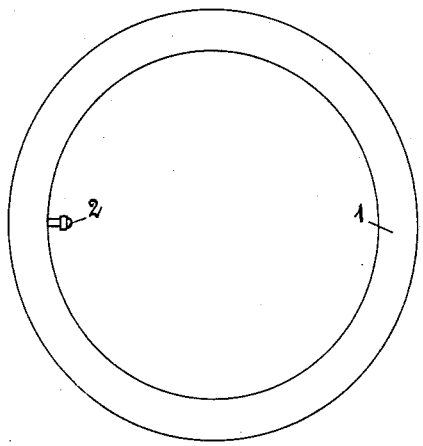
Figure 1 is an elevation of a unit coil or winding.
Figures 2, 3, 4, 5:
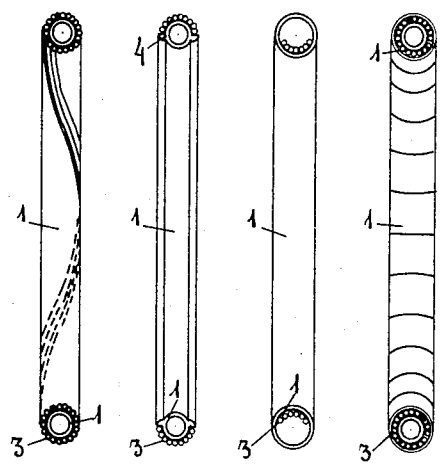
Figs. 2, 3, 4 and 5 are central sections of windings, showing typical arrangements of the conductors.

Referring to Figs. 1 to 5 inclusive, 1 is the body or supporting base of a unit winding, made of flexible insulating material, such as rubber or impregnated fabric. In the embodiment disclosed, it is similar to the inner tube of an ordinary automobile tire, and such inner tubes make very satisfactory supporting bodies for windings according to my invention. 2, is the usual valve for inflation of the body. The windings 3 can be arranged in many ways, inside the body of the coil as shown in Fig. 2, around the outer surface of the body as in Fig. 3, on the outer part of the body held in position by one or more projections or grooves, as in Fig. 4, or the windings may be distributed along the whole outside surface of the body and kept in position by insulating ribbon or cord as in Fig. 5. The windings shown in the drawing at 3, may be one or more layers or sets connected with each other conductively or inductively or in any suitable way for the purpose intended. Any suitable wires may be used for the windings, solid, stranded; or the stranded cable with individual strands insulated by enamel, herein referred to as litzen.

Such a coil as hereinabove described can be collapsed by opening the valve 2. This is a great advantage in portable sets.

Various means for varying the shape of such windings will now be described.

Figure 6:
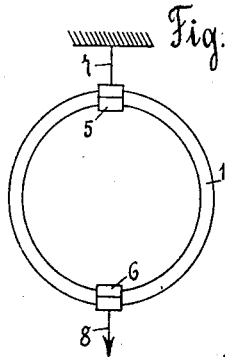
Fig. 6 illustrates one simple way of changing the electro magnetic constants of a coil or winding as shown in Fig. 1.

Referring to Figure 6, coil 1 is shown as provided with clips 5 and 6, to which are attached cords 7 and 8. Cord 8 may extend to any remote point for receiving tension to draw clips 5 and 6 away from each other and elongate the coil, distorting its shape from that of a true circle, and varying its inductance and other electrical properties by reason of such distortion.

Figure 7:
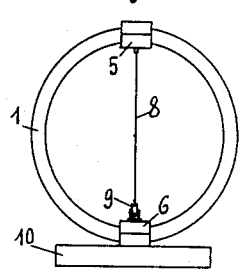
Fig. 7 is a side elevation.

The coil illustrated in Figs. 7 and 8 can be rotated about its mounting in clip 6 to shift the plane of the winding. In any position of adjustment the tension cord 8 extends from clip 5 around a pulley 9 mounted on clip 6, and tension exerted thereon will pull clips 5 and 6 together to change the shape of the winding. A suitable supporting base 10 may be provided for clip 6.

In Figs. 9 and 10 I have illustrated means for simultaneously varying the shape of a plurality of unit windings. Shoes 25 and 26 engage all the windings at diametrically opposite points, shoe 25 being supported on base 27, and shoe 26 being slidable on uprights 28 and 29. An adjusting screw 36 having an operating head 37 is threaded thru the upper cross piece 30 to force shoe 26 down and change the shape of the coils.

In Figs. 11 and 12 I have illustrated a combination primarily useful as a variocoupler or transformer. In frame 12 by means of clips 13 and 15 I support a plurality of units 1, alternated with a plurality of units 11 supported by similar clips 14 and 16. Cords 17 and 18 run from clips 15 and 16 respectively over pulleys 19 to drums 21 and 20 respectively mounted on a common shaft 22 provided with actuating means at 23. In the position shown in the drawings, the shaft has been rotated to draw all the windings out of circular into elliptical shape, as shown by the small vertical dimensions of winding 11 in Fig. 12 and the much larger vertical dimensions of winding 1. When this occurs only a portion of the area included in winding 11 is directly in line with the flux generated by windings 1 and vice versa, so that distortion of the windings changes the couplings between them.

It will be obvious that unit windings according to my invention may be assembled into sets in a large number of different ways, and changed in shape simultaneously or one at a time to secure constant or varying sensitivity of adjustment. They may also be employed to form different parts of a complete set, for instance Figs. 11 and 12 show windings suitable for the primary and secondary of one or more transformers, or vario couplers.

Fig. 13 illustrates an alternative method of varying the inductance of a unit coil 1. The coil is supported by clips 33 and 35 in a frame 34, clip 35 being rotatable about a vertical axis by shaft 36 and hand wheel 37 to twist the coil into the shape of a lemniscate.

In the foregoing instances the variation is provided primarily by changing the magnitude or shape of area over which flux is generated by the coil. The present invention, however, is not thus limited, but includes any variation in the shape of the windings to secure the desired variation in electric or magnetic properties.

Referring to Fig. 14, a plurality of unit windings 1 spaced by spacer rings 33 are placed on base 34 under cover plate 35, guided in its vertical movement by side pieces 36 and 37. Cross piece 38 carries an adjustment screw 39 by means of which the windings may be axially compressed to vary the axial spacing, and the electric and magnetic properties of the combination.

The flexible body might also be made spherical, conical or in any other suitable form, and the windings may be fixed on the surface as in Figs. 2 to 5 inclusive or embedded in the body of the insulator. Any winding or set of windings may obviously consist of a continuous spiral or of separate coils positioned in spaced parallel planes. In Fig. 15 I have illustrated a spherical unit body having windings 40 embedded in it, said windings comprising separate coils lying in parallel spaced planes. The body may be compressed between base 41 and cover plate 42 guided by side columns 43 and pressed into place by adjusting screw 45 carrying hand wheel 46 and threaded to cross piece 44.

Referring again to Fig. 1, it will be evident that by attaching a weight to tension cord 8, and varying the pressure of the compressed air inflating the unit 1, variations in shape and size of the windings may be obtained. This alternative method of operation is applicable to all the embodiments shown.

It will be obvious that units according to the present invention are very well adapted to control from a remote point, by electrical or mechanical transmission or both from the point of control to the unit controlled. They are also equally serviceable in transmitting or receiving work, A convenient and satisfactory method of making units according to my invention when the distortion in such that the methods of attachment illustrated in Figs. 2 to 5 are not satisfactory, is to draw a line or stripe of conducting material on the inflated body in any suitable way, as by means of a brush or air brush. This provides a very flexible winding, and avoids expensive mechanical means for fastening the conductors in place.

Without further elaboration, the foregoing will so fully explain the principles of my invention, that others may, by applying current knowledge, readily adapt the same for use under various conditions of service. It will, for instance, be obvious that where the conducting windings themselves posses sufficient elasticity, the use of springs or compressed air is unnecessary. Many modifications and alterations of the invention may be made by those skilled in the art, without eliminating certain features which may properly be said to constitute the essential items of novelty involved, which items are intended to be defined and secured to me by the following claims.

I claim:

1. In combination a plurality of resilient windings, and means for distorting them to change individual windings, and the couplings between windings.

2. In combination a plurality of resilient windings and means for distorting them differently to change individual windings and the couplings between windings.

3. In combination an annular insulating body, a winding on said body, and means for distorting the body to vary the electrical constants of the winding.

4. In combination, an inflated insulating body, a winding on said body and means for distorting the body to vary the electrical constants of the winding.

5. In combination, an insulating inflated body, a conductive layer on said body forming a winding, and means for distorting the shape of said body to change the electrical constants of said winding.

6. In combination, an inflated annular insulating body, a winding carried by said body, and means for distorting the shape of said body in the plane of the annulus to vary the constants of said winding.

In witness whereof I have hereunto set my hand in the presence of two witnesses.

JOSEPH TYKOCINSKI-TYKOCINER.

Witnesses:
 JOSEPH D. MANNE,
 SIMON GOTTSCHALK.